Feb. 2, 1965    J. L. MARTIN    3,168,114
INSULATED PIPE ANCHOR
Filed April 8, 1963
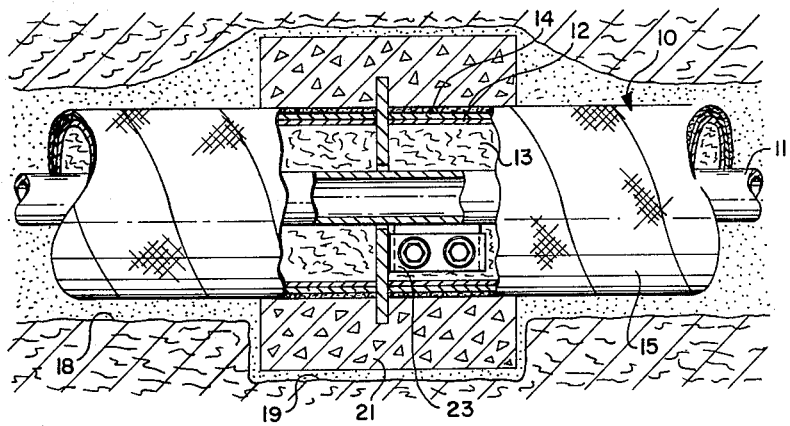
FIG.-1
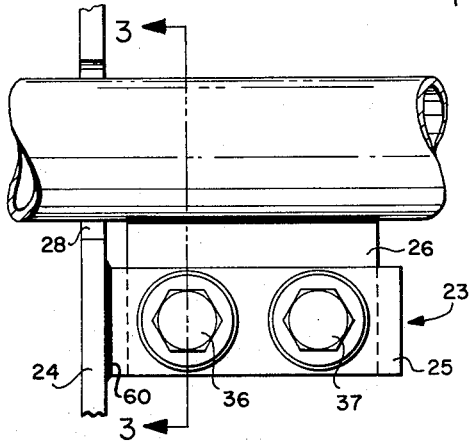
FIG.-2
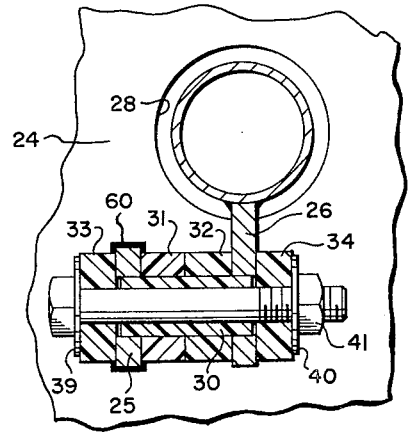
FIG.-3
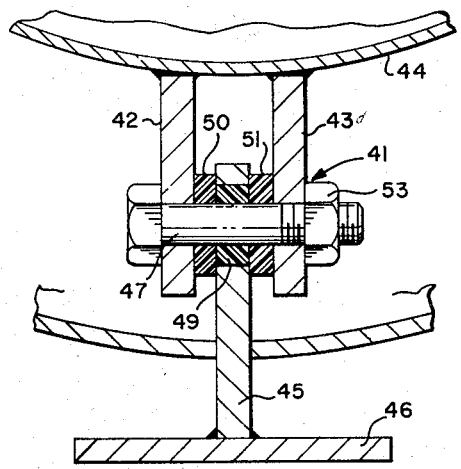
FIG.-5
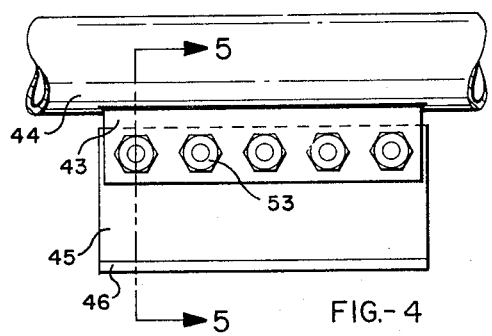
FIG.-4
INVENTOR.
JOSEPH L. MARTIN
BY 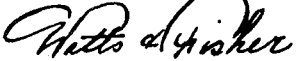
ATTORNEY

United States Patent Office 3,168,114
Patented Feb. 2, 1965

3,168,114
INSULATED PIPE ANCHOR
Joseph L. Martin, Wadsworth, Ohio, assignor to Ric-Wil Incorporated, Barberton, Ohio, a corporation of Ohio
Filed Apr. 8, 1963, Ser. No. 271,411
6 Claims. (Cl. 138—105)

The present invention relates to anchors and more particularly to conduit anchors which are thermally and electrically insulated from the conduit.

The present invention is particularly suitable for use with conduits which are installed underground and used for transporting steam and other fluids under temperatures differing from atmospheric or ground temperatures. Such conduits are often of a "unit-type" construction wherein the conduits comprise an inner fluid conduit, a layer of insulating material, and an outer casing. These units are prefabricated and the units are joined at the site of installation.

Since such units are subject to variations in temperature they are also subject to expansion and contraction. For this reason expansion joints are provided at spaced locations along the conduit. In order to assure proper distribution of the conduit expansion and contraction among the various expansion joints, it is necessary to anchor the conduit intermediate between these expansion joints.

One anchor construction which has found wide use for anchoring, or fixing, the conduits is disclosed in U.S. Patent No. Re. 22,988, issued March 16, 1948, to William S. McLeish. In the McLeish anchor, anchoring of the conduit is effected by plates each of which has a central hole for permitting the plates to be rigidly mounted on the pipe conduit intermediate expansion joints of the conduit. The casing around the pipe is formed in sections and adjacent ends of two of these sections are welded to the opposite faces of a plate interposed between them. The area of each square plate is made substantially greater than the cross-sectional area of the casing so that the sides of the plates project beyond the casing around its entire periphery. When a conduit is installed by embedding it in a block of concrete or the like, the bearing surfaces presented by the extending side portions of a plate serve to hold the plate, the casing, and the conduit sections against axial displacement.

The problem with the McLeish anchor, as well as with other prior anchors, is the anchor plate acts as a conducting medium to drain heat from the inner fluid conduit. In addition, the anchor plate connects the fluid conduit directly to the ground and provides almost ideal conditions for deterioration of the fluid conduit by electrolysis. If cathodic protection is applied to the buried conduit system to prolong the life of the external casing, the McLeish anchor does not electrically isolate the fluid conduit from the casing. Current from sacrificial anodes will therefore penetrate to the fluid conduit. This means that dielectric unions must be used on the fluid conduit at the terminal ends of the underground system to isolate the buried fluid conduit from the fluid conduit inside the building.

In an attempt to overcome the problems of thermal drain-off and electrolysis, prior anchors have spaced the anchor plate from the inner conduit and filled such space with insulation material. Such prior anchors, in order to provide a secure, non-metallic connection of the anchor plate to the inner conduit, have generally comprised a complex arrangement of metal plates and insulating fill. Moreover, the assembly of such prior anchors has been quite intricate and can usually be performed only in a shop with a special setup. In addition, dis-assembly of the anchor from the conduit, as for repair, has been difficult and at times impossible. In addition, at least disassembly without severely damaging the adjacent portions of the conduit has been substantially impossible. Moreover, in such prior anchors, the expansion of the conduit greatly compressed the insulating fill with a resultant loss in the insulating properties.

The conduit anchor of the present invention provides an anchor plate having interior edges defining an opening for receiving the fluid conduit in a spaced relation. The anchor plate is disposed transversely to the conduit and extends radially from the interior edges to beyond the outer casing for embedment in a suitable matrix. A first longitudinally disposed tie plate is fixed to the embedded anchor plate. A second longitudinally disposed tie plate is fixed to the inner conduit and is spaced from the first longitudinally disposed tie plate. Suitable insulating spacers are positioned between the longitudinally disposed plates and a fastening device clamps the plates in a rigid, insulating relationship and rigidly secures the inner conduit to the anchor plate. Suitable insulating spacers are positioned between the longitudinally disposed plates and a fastening device clamps the plates in a rigid, insulating relationship and rigidly secures the inner conduit to the anchor plate.

One of the principal advantages of the conduit anchor of the present invention is a rigid anchorage of the conduit by a structure which is simple in construction and assembly. No special setup benches are required for assembly. In fact, the anchor plate may be assembled on the fluid conduit at the site of installation. The present anchor construction also permits disassembly, and facile reassembly, both of which may also be accomplished at the site of installation. Facility of assembly either at the shop or at the site of installation is further enhanced by the fact that securement of the longitudinally disposed tie plate to the inner conduit is by a straight weld easily made on a level plane.

An additional advantage of the present invention is that the length of the longitudinal tie plates is determined by the load to be carried by the anchor so that only the required lengths need be provided and no more. In addition, where the original calculations as to probable load prove to be underestimated, longer or additional longitudinal plates may be added at the site of installation.

Another feature of this structure is the insulating spacers disposed between the longitudinally disposed plates are placed initially in slight compression by the fastening device, but are not further compressed by movement of the inner conduit. Rather, the insulating spacers are subject to a shearing force which does not radically affect their thermal and electrical insulating properties.

Further, as many, or as few, shear absorbing spacers as desired may be used so that crushing or shearing of the insulation, no matter how great the load, can be completely obviated.

Accordingly, the object of the present invention is to provide a new and improved conduit anchor.

Other objects and a fuller understanding of the invention may be had by referring to the following description and claims taken in conjunction with the accompanying drawings, in which:

FIGURE 1 is a fragmentary side view, parts being broken away and some shown in section of an intermediate portion of an insulated fluid conduit utilizing the conduit anchor of the present invention;

FIGURE 2 is a longitudinal side view, on an enlarged scale, of the fluid conduit anchor of the present invention;

FIGURE 3 is a cross-sectional view taken on line 3—3 of FIGURE 2;

FIGURE 4 is a longitudinal view of another form of the conduit anchor of the present invention; and, FIGURE 5 is a fragmentary, cross-sectional view taken on the line 5—5 of FIGURE 4.

Referring now to the drawings, a conduit unit utilizing the conduit anchor of the present invention is generally indicated by the reference character 10. The conduit unit 10 includes an inner fluid conduit or pipe 11, an outer casing 12 concentrically surrounding the conduit 11, and suitable heat insulating material 13 surrounding the fluid conduit 11 between it and the outer casing 12. The outer casing 12 may consist of a metallic tube that is coated suitably such as with a layer of asphalt 14. An outer wrapping of felt or other paper 15 is used when the coating is asphalt.

FIGURE 1 shows the conduit unit 10 installed in a ditch 18 which is enlarged at 19 in the intermediate region of the conduit unit. A block 21 of concrete or similar matrix material is cast in the enlarged portion 19 of the ditch so as to completely surround and embed the intermediate portion of the conduit unit 10.

To securely anchor, or lock, this intermediate portion of the conduit unit 10 against axial movement, a conduit anchor assembly 23 is provided. As shown most clearly in FIGURES 2 and 3, the conduit anchor assembly 23 includes a rectangular anchor plate 24. The anchor plate 24 includes a central opening 28 and is disposed around the fluid conduit 11. The anchor plate 24 is in a plane transverse to the axis of the conduit 11 and its interior edges defining the opening 28 are spaced from the fluid conduit 11. At least two opposite ends of the rectangular anchor plate 24 extend beyond the outer casing 12 and are embedded in the concrete block 21.

The outer casing 12 is shown as being formed in axially spaced sections, the adjacent ends of which are welded to the opposite side faces of the anchor plate 24. Preferably, the ends of the casing sections are welded around their peripheries to provide an absolute seal against the entrance of moisture at the juncture of the casing sections and the anchor plate.

The fluid conduit 11 is rigidly anchored, or fixed, to the anchor plate 24 by tie plates 25, 26. The tie plates 25, 26 extend longitudinally relative to the longitudinal axis of the fluid conduit 11 and are in a spaced relation. The anchor tie plate 25 is fixed to the anchor plate 24, preferably by welding as at 60. The conduit tie plate 26 is fixed to the conduit 11, preferably by brazing.

Insulating spacers 30–34 are provided to assure thermal and electrical insulation between the tie plates 25, 26 and, consequently, between the fluid conduit 11 and the anchor plate 24. Bolts or other suitable fasteners 36 pass centrally through holes in the tie plates 25, 26 and cooperate with the insulating devices 30–34 to provide a metal reinforced insulating securement of the spaced tie plates.

The arrangement of insulating devices 30–34 and the tie plates 25, 26 at each of the bolts 36, 37 is illustrated in FIGURE 3 by the section 3—3 taken at the location of the bolt 36 in FIGURE 2. A first of the insulating devices is a sleeve 30 which is partially disposed in the holes in the tie plates 25, 26 and surrounds a rod-like portion of the bolt 36. The sleeve 30 serves to maintain the bolt 36 in spaced insulated relation to the tie plates 25, 26. The insulating devices 31, 32 are washer-like spacers disposed around the sleeve 30 and between the tie plates 25, 26. The insulating devices 33, 34 are in the form of washers which are mounted on the bolt 36 and abut against the tie plates 25, 26. Metal washers 39, 40 are mounted on the bolt 36 against the outermost surfaces of the insulating washers 33, 34 to provide a hard bearing surface for the head of the bolt 36 and a threading nut 41. Tightening the nut 41 on the bolt 36 places the spacers 31, 32 and the washers 33, 34 in compression and securely and rigidly locks the tie plates 25, 26 in their spaced, insulated relation. The insulating sleeve 30 is not placed in compression as its length is shorter than the final distance between the outermost surfaces of the tie plates 25, 26. The spacing between the ends of the sleeve 30 and the insulating washers 33, 34 is exaggerated in the drawing for the purpose of illustration.

The requirements for the insulating devices 30–34 are that they have good thermal and electrical insulating properties. Such insulating material should also have sufficient compressive strength to withstand the initial compressive force of tightening the nut 41 on the bolt 36 to lock the tie plates 25, 26 in their spaced relation. One such insulating material which has been found suitable for the above purposes is silicone mica.

When in use, the fluid pipe 11 will try to move axially as the result of expansion and contraction due to temperature fluctuations. The conduit anchor assembly, of course, resists such axial movement. The insulating devices 30–34 of the anchor assembly resists some of this axial movement. However, a good portion of the resistance is by the bolts 36, 37 which extend through the middle of the insulating structure and act as a reinforcing member. Thus, the resistance to axial movement is accomplished essentially by a metal reinforced, insulating material.

FIGURES 4 and 5 illustrate a second conduit anchor assembly 41 also taught by the present invention. The conduit anchor assembly 41 is especially suitable for pedestal mounting of the conduit unit 10. The anchor assembly 41 includes a pair of conduit tie plates fixed longitudinally to the conduit 44 as by brazing. An anchor tie plate 45 is fixed to a base plate 46 along one longitudinal side. The base plate 46 serves the function of the block 21 of FIGURE 1 and in that sense is also a block. In the embodiment shown, the base plate 46 and the one longitudinal side of the tie plate 45 fixed to the base plate 46 parallel the longitudinal axes of the conduit 44 and surrounding casing. The tie plate 45 extends between the conduit tie plates 42, 43 along its other longitudinal side. The anchor tie plate 45 includes a plurality of openings which are axially coextensive with openings in the conduit tie plates 42, 43. Bolts 47 or other suitable fasteners extend centrally through the openings in tie plates 42, 43, 45. An insulating sleeve 49 is mounted on the bolt 47 and disposed within the opening in the anchor tie plate 45. The insulating sleeve 49 maintains the tie plate 45 in an insulated relation to the bolts 47. Insulating spacers 50, 51 are also mounted on the bolt 47 and disposed between the anchor tie plate 45 and each of the conduit tie plates 42, 43. A nut 43 is threaded on the bolt 47 to securely lock the tie plates 42, 43, 45 and the insulating spacers 50, 51 in a sandwiched insulating relation.

The conduit anchor of the present invention is especially suitable for use in installations having a plurality of fluid conduits in the internal piping system. In such a plural fluid conduit system the conduits are often of dissimilar metals such as brass, copper, and steel and should be isolated and insulated from each other as well as from the outer casing. By using a separate anchor assembly each conduit is secured to the same anchor plate. This arrangement assures that all of the fluid conduits are isolated and insulated from each other as well as from the outer casing 12.

A conduit anchor made in accordance with the teachings of the present invention thus provides a secure locking of one or more fluid conduits against axial movement and further permits assembly, disassembly and even reassembly at the site of installation. The separable feature of the anchor plate from each fluid conduit by disassembling the tie plate insulating device arrangement is especially useful for in situ modifications of the anchor, especially where greater or lesser anchorage or a change in the location of the anchor is desirable. Finally, and of great importance, the insulating sleeve, which insulates the rod-like portion of the fastener from the tie-plate, experiences substantially no compression and very little, if any, shear. Thus, the insulating sleeve maintains its insulating properties throughout the period of use of the anchor assembly.

Briefly stated, the conduit anchor of the present invention is believed to comprise essentially an anchor plate embedded or otherwise fixed to a suitable matrix such as concrete, a first tie plate secured to the fluid conduit, a second tie plate fixed to the anchor plate, insulation disposed between the tie plates and maintaining such tie plates in a spaced electrically and thermally insulated relation, and suitable fastening devices locking the tie plates in such spaced relation. The invention further contemplates that at least one of the tie plates extends longitudinally of the conduit.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a conduit system including an outer casing in spaced relation around an inner fluid conduit, an improved conduit anchor assembly including a support, the anchor assembly being for locking a portion of the fluid conduit against axial movement by fixing such fluid conduit portion to said support, said conduit anchor assembly comprising:
   (a) a first elongated narrow tie member fixed to the fluid conduit;
   (b) a second elongated narrow time member fixed to the support;
   (c) said tie members extending longitudinally relative to the longitudinal axis of said fluid conduit;
   (d) said tie members including portions in overlapping relation with each other; and,
   (e) removable fastener means disposed transversely of the pipe and clamping said overlapping portions together.

2. The conduit system of claim 1 wherein the overlapping portions of the tie members have insulating member abutting faces oriented toward one another, and wherein first and second insulating members are disposed between the overlapping portions with the first insulating member abutting said tie member faces and the second insulating member is between said tie members and the fastener means, and wherein said fastener means draws said tie members together against the first insulating member whereby the first insulating member maintains the tie members in a spaced relation and said second insulating member maintains an electrically and thermally insulated relation between said tie members and said tie means.

3. The conduit system of claim 2 including, in combination: said first and second insulating members comprising inner and outer telescoped tubular members disposed around said fastener means.

4. In a conduit system including an outer casing in spaced relation around an inner fluid conduit, an improved conduit anchor assembly including a block, said assembly being for locking a portion of the fluid conduit against axial movement by fixing such fluid conduit portion to said block, said conduit anchor assembly comprising:
   (a) an anchor plate secured to the block and extending transversely of the axis of the fluid conduit; said anchor plate including internal edges defining a fluid conduit-receiving opening;
   (b) the fluid conduit passing through said opening in spaced relation to said internal edges;
   (c) a first elongated narrow tie plate fixed to said conduit;
   (d) a second elongated narrow tie plate fixed to said anchor plate in parallel relation to said first tie plate;
   (e) said tie plates extending longitudinally relatively to the axis of said fluid conduit; and,
   (f) fastener means disposed transversely of the pipe and releasably securing said tie plates together to form a rigid lock of said fluid conduit against axial movement relative to said anchor plate.

5. In a conduit system including an outer casing in spaced, insulated relation around an inner fluid conduit, an improved conduit anchor for locking a portion of the fluid conduit against axial movement by fixing such fluid conduit portion to a block and for thermally and electrically insulating the conduit from the casing, said conduit anchor comprising:
   (a) an anchor plate secured to the block and extending transversely to the axis of the fluid conduit, said anchor plate including internal edges defining a fluid conduit-receiving opening;
   (b) the fluid conduit passing through said opening in spaced relation to said internal edges;
   (c) a first elongated, narrow tie plate fixed to said conduit;
   (d) a second elongated, narrow tie plate fixed to said anchor plate in spaced parallel overlapping relation to said first tie plate;
   (e) said tie plates being disposed longitudinally with respect to the conduit axis and having aligned openings with axes disposed transversely of the axis of the conduit;
   (f) an insulating spacer disposed between said tie plates and having an opening aligned with said tie plate openings;
   (g) an insulating sleeve disposed within said spacer opening and partially within each of said tie plate openings;
   (h) fastener means including rod-like portions disposed transversely of the conduit and within said insulating sleeve and passing through said tie plate and spacer openings;
   (i) said insulating sleeve spacing said fastener means from said tie plate members in thermal and electrical insulated relation;
   (j) insulating washers disposed around said rod-like portions and abutting against a side surface of said tie plate members opposite said insulating spacer; and,
   (k) locking means operatively engaging said fastener means and operative to move said insulated washers, said tie plates and said insulating spacer in a tight sandwiched relation, whereby said fluid conduit is locked to said anchor plate in electrical and thermal insulated relation thereto.

6. In a conduit system including an outer casing in spaced, insulated relation around an inner fluid conduit, an improved conduit anchor for locking a portion of the fluid conduit against axial movement by fixing such fluid conduit portion to a block and for thermally and electrically insulating the conduit from the casing, said conduit anchor comprising:
   (a) an anchor plate secured to the block;
   (b) first and second spaced, elongated, narrow longitudinally extending tie plates fixed to the conduit;
   (c) a third tie plate fixed to said anchor plate and including portions extending between said first and second tie plates in spaced parallel overlapping relation;
   (d) said tie plates having axially aligned openings;
   (e) an insulating sleeve disposed within the third tie plate opening;

(f) insulating spacers disposed between each of said tie plates and having openings axially coextensive with said tie plate openings;

(g) fastener means disposed transversely of the conduit including rod-like portions passing through all such openings; and, (h) locking means operatively engaging said fastener means and operative to move said tie plates against said insulating spacers in a tight sandwiched relation whereby said insulating sleeve and insulating spacers provide thermal and electrical insulation between said first and second tie plates and said third tie plate.

References Cited in the file of this patent

UNITED STATES PATENTS

| | | |
|---|---|---|
| Re. 22,988 | McLeish | Mar. 16, 1948 |
| 2,116,302 | Chernosky | May 3, 1938 |
| 2,706,495 | Risley | Apr. 19, 1955 |
| 2,759,491 | Everhart | Aug. 21, 1956 |
| 2,868,230 | Stokes | Jan. 13, 1959 |
| 2,914,090 | Isenberg | Nov. 24, 1959 |

FOREIGN PATENTS

| | | |
|---|---|---|
| 1,264 | Great Britain | Nov. 20, 1913 |